United States Patent [19]

Rogers

[11] 4,034,910
[45] July 12, 1977

[54] COMBINATION ADVERTISING, COIN AND RECEIPT HOLDING ENVELOPE

[75] Inventor: Arthur M. Rogers, Far Rockaway, N.Y.

[73] Assignee: Exclusive Envelope Corporation, New York, N.Y.

[21] Appl. No.: 657,865

[22] Filed: Feb. 13, 1976

[51] Int. Cl.$^2$ .................................. B65D 27/00
[52] U.S. Cl. .......................... 229/68 R; 40/10 B; 229/73; 229/92.9
[58] Field of Search ......... 206/806, 813; 229/68 R, 229/74, 92.9, 73; 40/10 B, 10D; 283/56

[56] References Cited

U.S. PATENT DOCUMENTS

| | | | |
|---|---|---|---|
| 2,188,813 | 1/1940 | King | 206/813 X |
| 2,589,632 | 3/1952 | Scott | 229/92.8 |
| 2,861,735 | 11/1958 | Faltin | 206/813 X |
| 2,925,675 | 2/1960 | Lumpkin | 40/10 D |
| 3,285,397 | 11/1966 | Silverman | 206/.83 |
| 3,327,416 | 6/1967 | Sanford | 229/74 |
| 3,467,299 | 9/1969 | Meyer | 229/72 X |
| 3,511,437 | 5/1970 | Shaad | 229/92.9 |
| 3,553,865 | 1/1971 | Jones | 40/10 D |
| 3,814,305 | 6/1974 | Szeyller | 229/92.9 |

Primary Examiner—Stephen P. Garbe
Attorney, Agent, or Firm—Philip D. Amins

[57] ABSTRACT

A specialized and multifunctional envelope is provided for displaying an advertiser's message having a detachable reply card and which envelope may thereafter be utilized for receipt collection and ready storage and availability of coins. The envelope comprises a front face portion and a rear face portion which contains an advertiser's message and a detachable return reply card disposed therebeneath. The rear face is also provided with an upper tab secured to the message portion along a fold line. The front face is secured to the rear face along a bottom fold line so as to form a pocket therebetween and includes an upper portion having a reminder message thereon, while the lower portion is provided with a reusable type tacky adhesive layer for releasable securement of coins thereto and for securement of the entire envelope to a support surface; said adhesive layer initially being covered by a releasable cover sheet.

29 Claims, 8 Drawing Figures

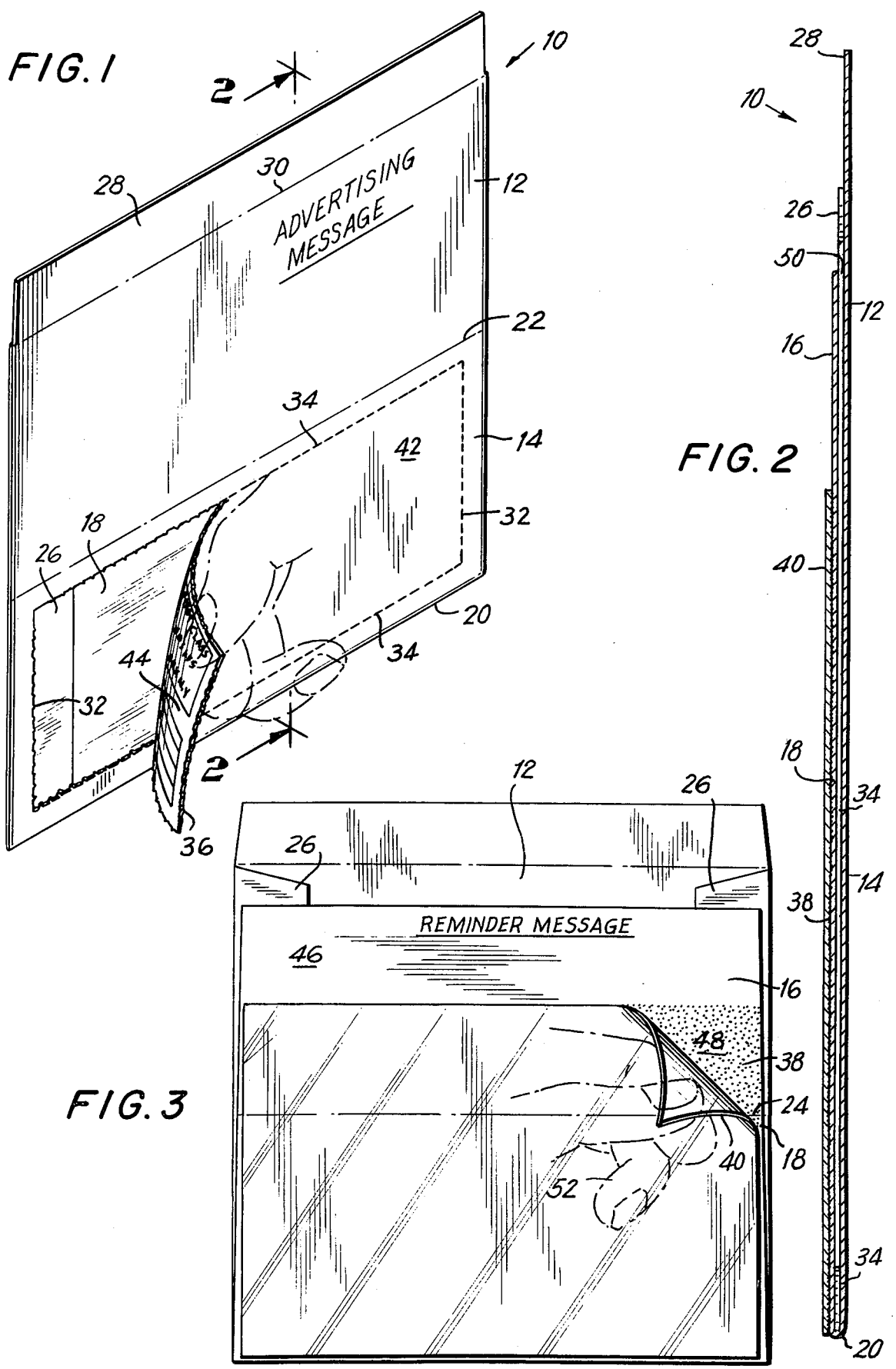

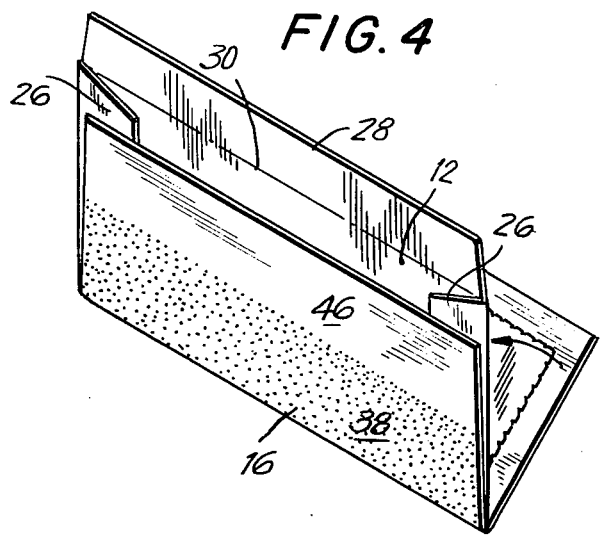
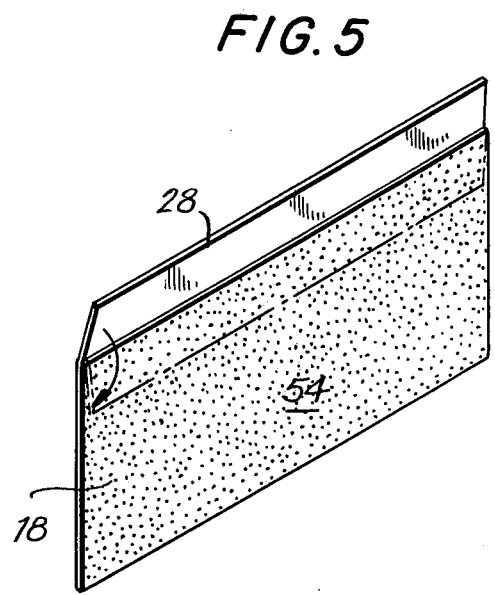
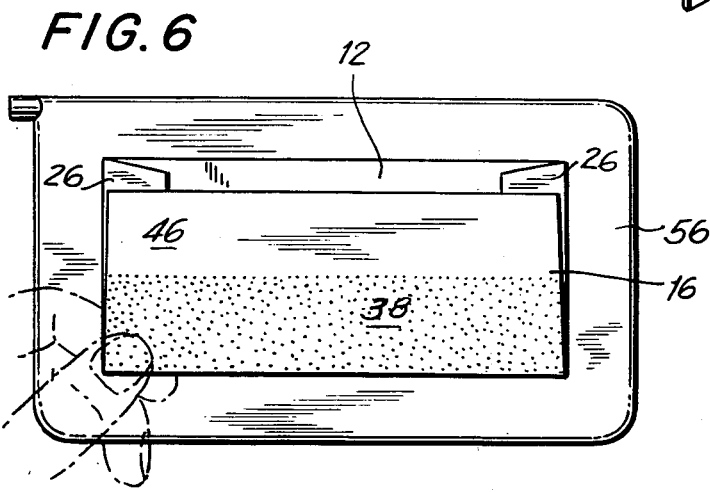
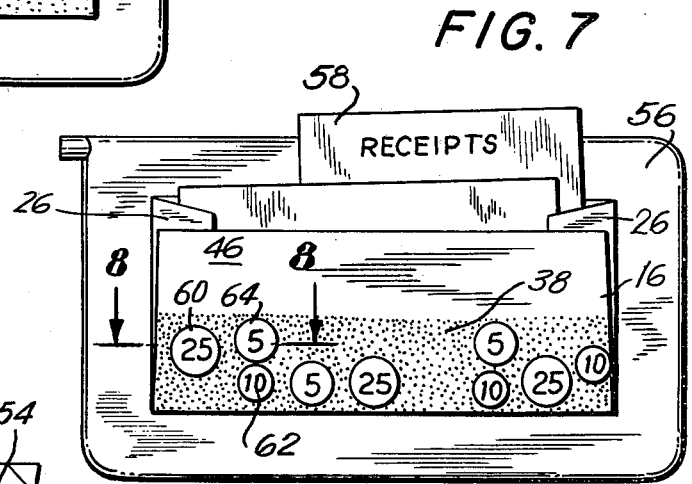
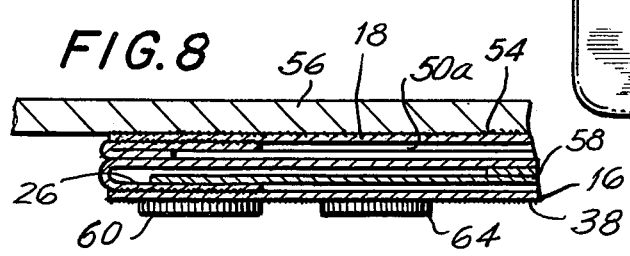

COMBINATION ADVERTISING, COIN AND RECEIPT HOLDING ENVELOPE

The present invention provides a new and novel specialized envelope construction which contains advertising matter and a return reply card in connection therewith. The envelope also provides a retention storage compartment for receipts, a front adhesive layer portion for releasable securement of coins thereto, and a rear adhesive layer portion, contiguous with the front adhesive layer portion, for securing the envelope to a support surface, such as the visor of an automobile.

BACKGROUND OF THE INVENTION

Heretofore there has been provided combination coin and bill holding cards and envelopes for mailing of currency and which have slots for coins, such as that disclosed by U.S. Pat. No. 3,511,437. Similar types of currency configuration envelopes are disclosed by U.S. Pat. Nos. 2,589,632, 3,285,397 and 3,814,305. However, none of the foregoing patents pertain to envelope constructions which provide for securement to a support surface after which they are used for holding receipts and coin storage.

Accordingly, it is the primary object of the present invention to provide a new and novel envelope construction capable of releasable adhesive securement to a support surface and when so positioned, serves the dual function of holding receipts and storing coins.

It is another object of the present invention to provide an envelope construction of the foregoing type which is particularly suited for releasable adhesive securement to the sun visor of an automobile.

It is a further object of the present invention to provide an envelope of the foregoing type which is provided with an advertising message which is always visible when utilizing the construction for its coin storing and receipt holding functions.

It is still another object of the present invention to provide an envelope of the aforementioned type having advertising information on the rear surface thereof which also includes a return reply card as a part thereof.

It is yet a further object of the present invention to provide an envelope construction of the foregoing type wherein the return reply card is detachable from the rear surface thereof by means of a plurality of intersecting score lines.

It is still another object of the present invention to provide an envelope construction of the foregoing type wherein the return reply card is capable of utilization by a person either prior to or subsequent to the use of the envelope for its coin storage and receipt holding functions.

BRIEF DESCRIPTION OF THE DRAWINGS

The foregoing and other objects, features and advantages of the present invention will become more apparent to those skilled in the art from the detailed description hereinafter considered in conjunction with the accompanying drawings, wherein:

FIG. 1 is a view of the rear surface of the combination advertising, coin and receipt holding envelope, constructed in accordance with the principles of the present invention;

FIG. 2 is a sectional view taken on the line 2—2 of FIG. 1;

FIG. 3 is a view of the front face portion of the envelope construction of FIG. 1;

FIG. 4 is a perspective view of the front face portion of the envelope construction after the same has been partially folded prior to actual use thereof;

FIG. 5 is a view of the rear surface of the partially folded envelope construction depicted in FIG. 4;

FIG. 6 is a front view of the envelope construction secured to a sun visor support surface;

FIG. 7 is a front view, similar to FIG. 6 depicting the utilization of the envelope for its coin storage and receipt holding functions; and FIG. 8 is a sectional view taken on the line 8—8 of FIG. 7.

DETAILED DESCRIPTION OF THE PREFERRED EMBODIMENTS

Referring now to the drawings, and more particularly, to FIGS. 1 through 3 thereof, there is depicted the new and novel combination advertising, coin and receipt holding envelope constructed in accordance with the principles of the present invention and generally denoted by the reference numeral 10. The envelope 10 is fabricated substantially from a continuous blank and comprises an upper rear portion 12, a lower rear portion 14, an upper front portion 16 and a lower front portion 18. The lower rear portion 14 and the lower front portion 18 are joined along a fold line 20, as best seen in FIG. 2.

The upper and lower rear portions 12 and 14, respectively, are separated by a fold line 22, formed therebetween. Similarly, the upper and lower front portions 16 and 18, respectively are separated by a fold line 24, formed therebetween. In this regard, attention is directed to the fact that the fold line 24 formed between the upper and lower front portions 16 and 18 is preferable but not essential for the efficacy of the envelope construction, as will become more apparent from the discussion hereinafter.

The upper and lower portions 12 and 14 are provided with side tabs 26 which are integral members extending along the entire vertical edge of said upper and lower rear portions. The side tabs 26 are folded inwardly upon the rear portions (as best seen in FIG. 3) and the upper and lower front portions 16 and 18 are secured to the side tabs 26 by means of an adhesive interposed therebetween. The upper rear portion is provided with an upper tab member 28, delineated by a fold line 30 formed between the upper tab 28 and the upper rear portion 12. The lower rear portion 14 is provided with a pair of vertical score lines or perforations 32 and a pair of horizontal score lines or perforations 34, 20 which are disposed in orthogonal intersecting relationship, so as to form a detachable portion 36 which serves as a return reply card, as will be discussed more fully hereinafter.

The entire lower front portion 18 and a part of the upper front portion 16 are provided with a tacky adhesive layer 38. The layer 38 has a transparent releasable cover sheet 40 disposed thereon.

As discussed previously, the envelope 10 is for the purpose of providing a combination advertising, coin and receipt holding construction, wherefore, the upper rear surface 12 is provided with an advertiser's detailed message and the return reply card 36 is provided with a space for a consumer's name and address on the outer surface 42 thereof and the advertiser's address and prepaid postage indicia on the inner surface 44 thereof.

Similarly, a reminder message is provided on the top half 46 of the upper front portion 16; the lower half 48 of the upper front portion 16 having the tacky adhesive layer 38 thereon. The securement of the front portion to the rear portion utilizing the side tabs 26, as discussed hereinbefore results in a pocket 50 being formed between said composite front and upper portions.

With reference now to the drawings, and more particularly, FIGS. 3 through 8 thereof, the actual folding of the envelope for its ultimate utilization shall now be described.

Attention is initially directed to the fact that the adhesive tacky layer 38 is substantially transparent and instructions as to the method of folding the envelope are contained on the outer surface of the lower front portion 18 and the lower half 48 of the upper front portion. Accordingly, the initial step is to peel away the releasable transparent cover layer 40 from the tacky adhesive layer by the utilization of a person's fingers 52, as depicted in FIG. 3. Thereafter, the envelope is bent along the parallel juxtaposed fold lines 24 and 22 so as to space the upper portions of the envelope from the lower portions of the envelope, as is depicted in FIG. 4. With the envelope folded as aforesaid, the upper tab member 28 is folded rearwardly so as to adhesively engage the lower adhesive portion of the lower front portion 18, which now appears to be the upper portion of the rear part of the folded envelope construction and as most clearly depicted in FIG. 5. This completes the final assembly of the envelope construction and the same appears in the form shown with a dotted line indication in FIG. 5.

The envelope is now ready for securement to a surface for its intended utilization; i.e., as a coin and receipt holder. Thus, the remaining tacky adhesive layer portion of the lower front portion, denoted 54 is then placed on a sun visor 56 and adhesively secured thereto. As discussed hereinbefore, a pocket 50 is formed between the front and rear portions of the envelope construction. However, in the assembled construction which is secured to the sun visor 56, as seen in FIG. 6, only a portion of the pocket 50 is utilized, which portion is that formed between the upper front portion 16 and the upper rear portion 12 and denoted by the reference numeral 50A in FIG. 8. The pocket 50A is used by a motorist to store toll receipts or any other receipts or papers therein in a very simple fashion. Since the pocket 50A will be readily accessible to the motorist while he is driving the vehicle and while he has received the toll receipt 58, he may immediately place the same in the pocket after he has received the same from the toll collector.

Attention is now directed to the fact that the adhesive coated lower half 48 of the upper front portion 16 is now directly in front of the motorist and the same may be used for easy and accessible storage of coins such as at 60, 62 and 64. Thus, the motorist has simple and easy accessibility both for the deposition of coins on the adhesive tacky layer 38 disposed immediately in front of him on the sun visor 56, and a very simple method of removing the coins when required to pay a toll. However, the advantage to the advertiser is that his message to the consumer always remains in the forefront of the motorist's mind since the reminder message on the portion 46 of the envelope is always in view when the motorist removes coins, deposits coins or places receipts in the pocket 50A.

The tacky adhesive layer 38 is of the type which is well known in the art and which may be reused for an extended number of times so that the envelope will normally remain in use for a period of a month or two during which time, the advertiser's message is always prominently displayed to the motorist. Therefore, should the motorist not have returned the reply card portion 36 when he first commenced utilization of the envelope, he may thereafter submit the same when he removes the envelope construction 10 from the sun visor 56, after the passage of the aforesaid period of time, viz., 1 or 2 months.

Attention is also directed to the fact that although the present envelope construction has been specifically disclosed for use on the visor of an automobile, the same may also be utilized with equal efficacy by placing the same on any support surface, whether planar or curved and of the type which may be found in any office, home or the like.

It will therefore be apparent to those skilled in the art that while I have shown and disclosed the preferred embodiment of the present invention, there are many changes, modifications and improvements which may be made therein without actual departure from the spirit and scope of the present invention, as hereinbefore disclosed, described and visualized.

What is claimed is:

1. A combination advertising, coin and paper holding envelope construction comprising
   a front portion, and
   a rear portion,
   means securing said rear portion with respect to said front portion in a manner such as to form a pocket therebetween,
   at least a part of said rear portion having an advertising message thereon,
   at least a part of said front portion being provided with a tacky adhesive surface area,
   fold means for enabling securement of an edge portion of said rear portion to a portion of said tacky adhesive surface area of said front portion by folding of said envelope,
   said tacky adhesive surface area extending from the bottom edge of said front portion substantially to said fold means,
   a first segment of said tacky adhesive surface area of said front portion being capable of securement to a support surface,
   a second segment of said tacky adhesive surface area of said front portion being capable of removable securement of coins thereon, and
   at least a portion of said pocket being capable of removable deposition of papers therein.

2. A combination advertising, coin and paper holding envelope construction in accordance with claim 1, wherein
   said adhesive tacky surface portion has a releasable cover sheet disposed thereon.

3. A combination advertising, coin and paper holding envelope construction comprising
   a front portion, and
   a rear portion,
   means securing said rear portion with respect to said front portion in a manner such as to form a pocket therebetween,
   at least a part of said rear portion having an advertising message thereon, at least a part of said front portion being provided with a tacky adhesive surface area, fold means for enabling securement of an edge portion of said rear portion to a portion of said tacky adhesive surface area of said front portion by folding of said envelope, a first segment of said tacky adhesive surface area of said front portion being capable of securement to a support surface, a second segment of said tacky adhesive surface area of said front portion being capable of removable securement of coins thereon, said rear portion having an upper portion and a lower portion, said lower rear portion having a plurality of perforations which are disposed in predetermined relationship formed thereon defining a removable part of said lower rear portion, and at least a portion of said pocket being capable of removable deposition of papers therein.

4. A combination advertising, coin and paper holding envelope construction in accordance with claim 3, wherein said removable part of said lower rear portion comprises an advertising return reply card.

5. A combination advertising, coin and paper holding envelope construction in accordance with claim 4, wherein said advertising message is disposed on the upper rear portion.

6. A combination advertising, coin and paper holding envelope construction in accordance with claim 5, wherein said rear portion is provided with a fold line defining said upper and lower rear portions.

7. A combination advertising, coin and paper holding envelope construction in accordance with claim 4, wherein said perforations are disposed in orthogonal relationship so as to form a removable part having a substantially rectangular configuration.

8. A combination advertising, coin and paper holding envelope construction in accordance with claim 3, wherein said perforations are disposed in predetermined orthogonal relationship forming score lines which define an advertising return reply card of rectangular configuration.

9. A combination advertising, coin and paper holding envelope construction in accordance with claim 1, wherein said fold means comprises a fold line on said rear portion, and said envelope construction is foldable on said fold line to enable securement of said edge portion of the rear portion to said portion of said adhesive tacky surface part of said front portion.

10. A combination advertising, coin and paper holding envelope construction in accordance with claim 1, wherein said means for securing said rear portion to said front portion comprises a pair of side tab members formed integrally with said rear portion, and said side tab members are folded inwardly and positionally disposed between said front and rear portions.

11. A combination advertising, coin and paper holding envelope construction in accordance with claim 1, wherein said rear edge portion which is adapted to be secured to said portion of said tacky adhesive surface area of said front portion comprises an upper tab member secured to said rear portion along another fold line.

12. A combination advertising, coin and paper holding envelope construction in accordance with claim 1, wherein said first segment of said tacky adhesive surface area of said front portion is securable to the sun visor of an automotive vehicle, and said portion of said pocket is capable of removable deposition of toll receipts therein.

13. A combination advertising, coin and paper holding envelope construction in accordance with claim 1, wherein a second part of said front portion disposed adjacent said second segment of said tacky adhesive surface area of said front portion is provided with a reminder advertising message.

14. A combination advertising, coin and paper holding envelope construction in accordance with claim 1, wherein said front portion is provided with a fold line, and said rear portion is provided with a fold line, said front portion and rear portion fold lines are disposed in juxtaposed parallel relationship.

15. A combination paper retention and coin storage envelope construction comprising an upper front portion,
a lower front portion,
an upper rear portion, and
a lower rear portion, means for securing said upper and lower front portions with respect to said upper and lower rear portions, respectively, a longitudinal horizontally disposed fold line formed between and defining said upper and lower rear portions, said lower front portion and a lower part of said upper front portion being provided with an adhesive tacky layer, said envelope construction being foldable on said horizontally disposed fold line to enable at least a segment of a lower part of said lower rear portion to be placed in abutting engagement with at least a segment of an upper part of said upper rear portion, means for securing said envelope in said folded position with said segment of said lower part of the lower rear portion disposed in abutting engagement with said segment of said upper part of the upper rear portion, said envelope in said folded position enabling said lower front portion to be capable of adhesive securement to a support surface, said front and rear upper portions forming a pocket therebetween capable of having papers removably retained therein, and said adhesive tacky layered lower part of said upper front portion being capable of having coins and similar adhesively securable articles detachably secured thereto.

16. A combination paper retention and coin storage envelope construction in accordance with claim 15, wherein
said envelope construction is fabricated from a continuous singular blank of sheet material.

17. A combination paper retention and coin storage envelope construction in accordance with claim 15, wherein
said adhesive layered lower front portion and lower part of said upper front portion is provided with a releasable cover sheet thereon.

18. A combination paper retention and coin storage envelope construction in accordance with claim 17, wherein
said adhesive layer and said releasable cover sheet are transparent, and
said lower front portion and lower part of said upper front portion are provided with instructions for the folding and utilization of said envelope construction.

19. A combination paper retention and coin storage envelope construction in accordance with claim 17, wherein
said means for securing respective ones of said upper and lower rear portions to respective ones of said upper and lower front portions comprises a pair of vertically disposed side tabs formed integrally with a selected one of said upper and lower rear portions and said upper and lower front portions and joined thereto along vertically disposed fold lines, and
said side tabs being folded iwardly and positionally disposed between said front and rear portions.

20. A combination paper retention and coin storage envelope construction in accordance with claim 19, wherein
said side tabs are formed integrally with said upper and lower rear portions.

21. A combination paper retention and coin storage envelope construction in accordance with claim 17, wherein
said lower rear portion has a plurality of perforations formed thereon defining a removable part thereof.

22. A combination paper retention and coin storage envelope construction in accordance with claim 21, wherein
said perforations are disposed in orthogonal relationship so as to form a removable part having a substantially rectangular configuration.

23. A combination paper retention and coin storage envelope construction in accordance with claim 17, wherein
said upper rear portion has an advertising message thereon.

24. A combination paper retention and coin storage envelope construction in accordance with claim 23, wherein
said lower rear portion has a plurality of serrations formed thereon defining a removable part thereof,
said removable part comprising an advertising return reply card, and
said perforations being disposed in orthogonal relationship and forming an advertising return reply card having a substantially rectangular configuration.

25. A combination paper retention and coin storage envelope construction in accordance with claim 24, wherein
an upper part of said upper front portion is provided with a reminder advertising message.

26. A combination paper retention and coin storage envelope construction in accordance with claim 25, including
a longitudinal horizontally disposed fold line formed between and defining said upper and lower front portions, and
said front and rear portion fold lines being disposed in substantially parallel juxtaposed relationship.

27. A combination paper retention and coin storage envelope construction in accordance with claim 15, wherein
said upper front portion has an upper horizontal edge,
said upper rear portion has an upper horizontal edge defined by a fold line,
an upper horizontally extending tab member secured to said upper rear portion along said last mentioned fold line and projecting above the upper horizontal edge of said upper front portion, and
said means for securing said envelope in said folded position comprises said upper horizontally extending tab portion disposed in adhesive securement with a lower segment of said adhesively layered lower front portion.

28. A combination paper retention and coin storage envelope construction in accordance with claim 27, wherein
said upper horizontal edge of said upper rear portion is disposed above the upper horizontal edge of said upper front portion.

29. A combination paper retention and coin storage envelope construction in accordance with claim 15, wherein
said support surface is the sun visor of an automotive vehicle.

* * * * *